(No Model.)

6 Sheets—Sheet 1.

F. H. RICHARDS.
BAND MECHANISM FOR ENVELOPE MACHINES.

No. 364,040. Patented May 31, 1887.

Witnesses:
Frank H. Pierpont
C. E. Buckland

Inventor:
Francis H. Richards (No Model.)  F. H. RICHARDS.  6 Sheets—Sheet 2.
BAND MECHANISM FOR ENVELOPE MACHINES.

No. 364,040.  Patented May 31, 1887.

Witnesses:
Frank H. Pierpont
C. E. Buckland

Inventor:
Francis H. Richards (No Model.) 6 Sheets—Sheet 3.
F. H. RICHARDS.
BAND MECHANISM FOR ENVELOPE MACHINES.
No. 364,040. Patented May 31, 1887.

Witnesses:
Frank H. Pierpont
C. E. Buckland

Inventor:
Francis H. Richards (No Model.) 6 Sheets—Sheet 4.
F. H. RICHARDS.
BAND MECHANISM FOR ENVELOPE MACHINES.
No. 364,040. Patented May 31, 1887.
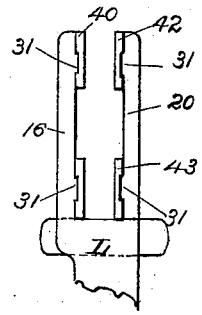
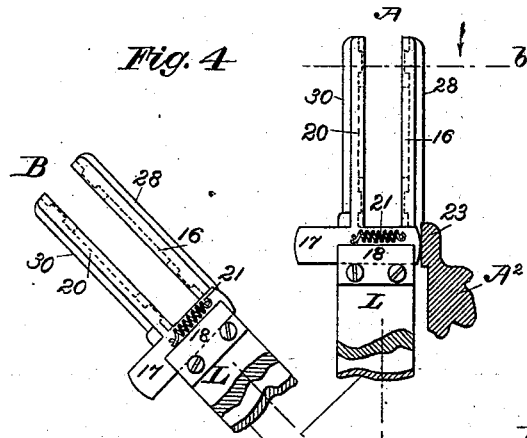
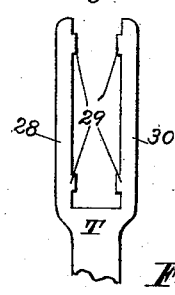
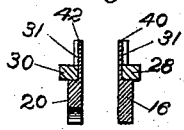
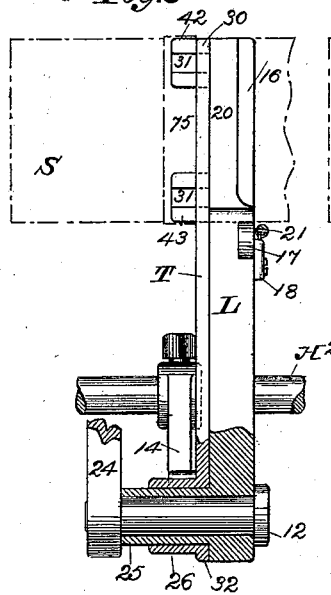
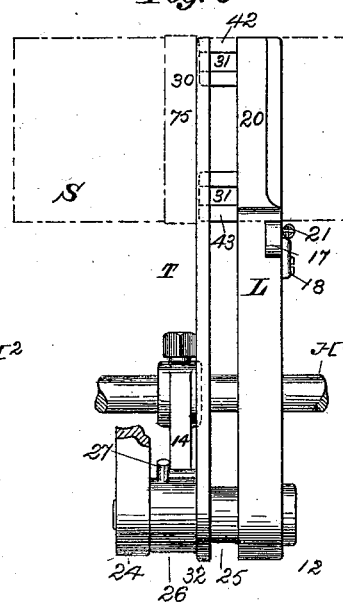
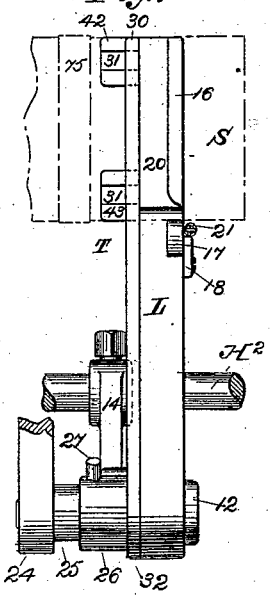
Witnesses:
Frank H. Pierpont
C. E. Buckland
Inventor:
Francis H. Richards (No Model.) 6 Sheets—Sheet 5.

F. H. RICHARDS.
BAND MECHANISM FOR ENVELOPE MACHINES.

No. 364,040. Patented May 31, 1887.

Witnesses:
Frank H. Pierpont
C. E. Buckland

Inventor:
Francis H. Richards (No Model.) 6 Sheets—Sheet 6.

F. H. RICHARDS.
BAND MECHANISM FOR ENVELOPE MACHINES.

No. 364,040. Patented May 31, 1887.

Witnesses:
Frank H. Pierpont
C. E. Buckland

Inventor:
Francis H. Richards

UNITED STATES PATENT OFFICE.

FRANCIS H. RICHARDS, OF SPRINGFIELD, MASSACHUSETTS, ASSIGNOR, BY MESNE ASSIGNMENTS, TO THE WHITE, CORBIN & COMPANY, OF VERNON, CONNECTICUT.

BAND MECHANISM FOR ENVELOPE-MACHINES.

SPECIFICATION forming part of Letters Patent No. 364,040, dated May 31, 1887.

Application filed February 13, 1886. Serial No. 191,885. (No model.)

*To all whom it may concern:*

Be it known that I, FRANCIS H. RICHARDS, a citizen of the United States, residing at Springfield, in the county of Hampden, State of Massachusetts, have invented certain new and useful Improvements in Band Mechanism for Envelope-Machines, of which the following is a specification.

This invention relates to mechanism for making and holding the band in machines for counting and packing envelopes. The invention is in the nature of an improvement on the band-making part of the mechanism described in my application, Serial No. 153,234, filed June 19, 1885, the object being to simplify the same while increasing the accuracy and rapidity of its operation.

To this end the invention consists in the improvements and combinations hereinafter described and claimed.

Figure 1:
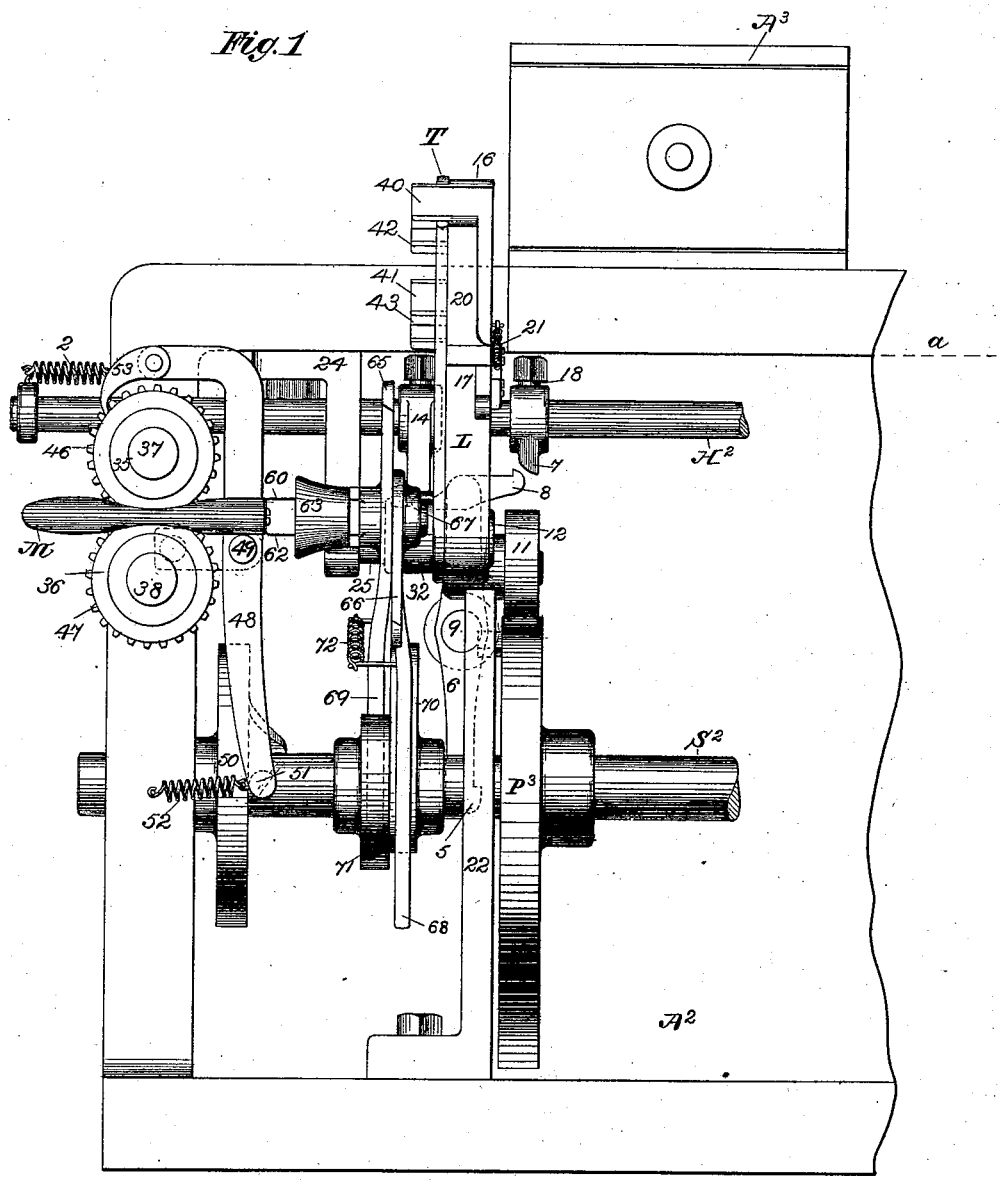
Figure 2:
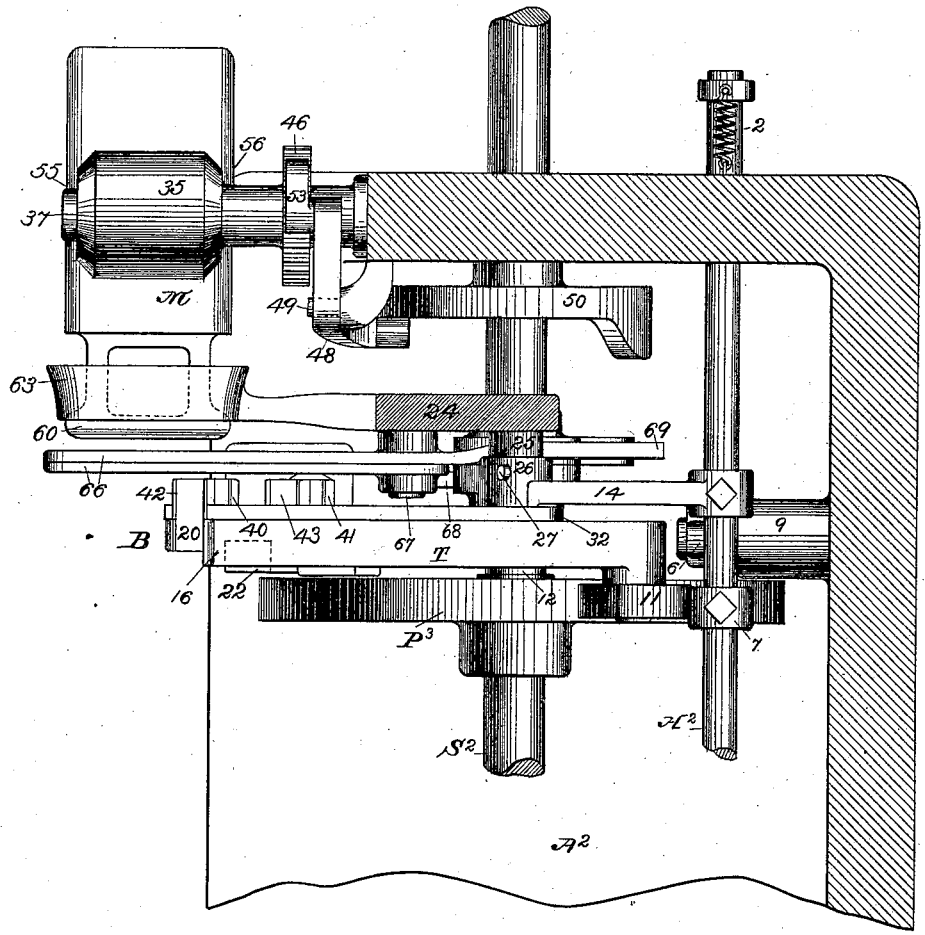
Figure 3:
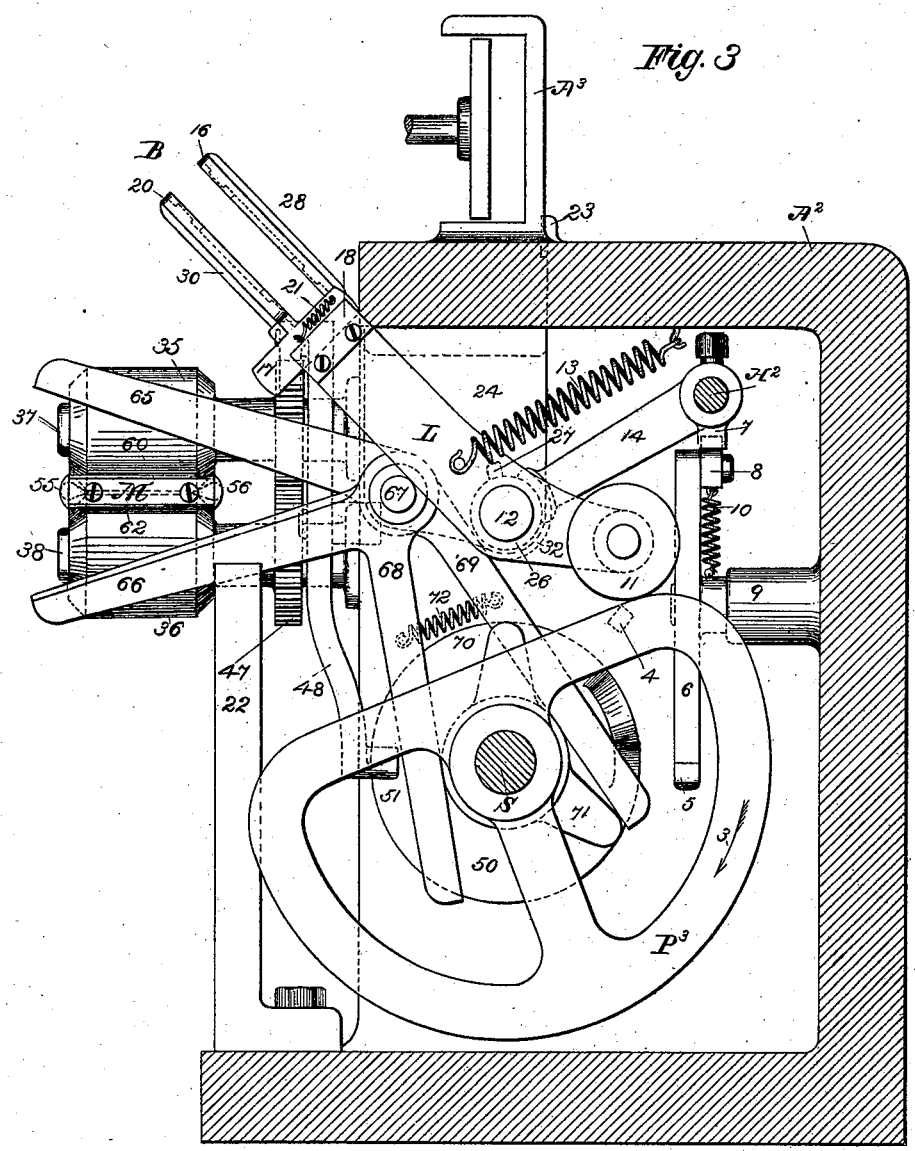
Figure 8:
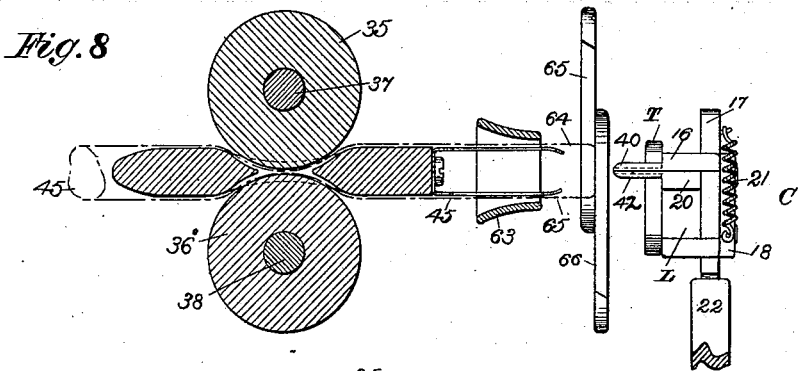
Figure 12:
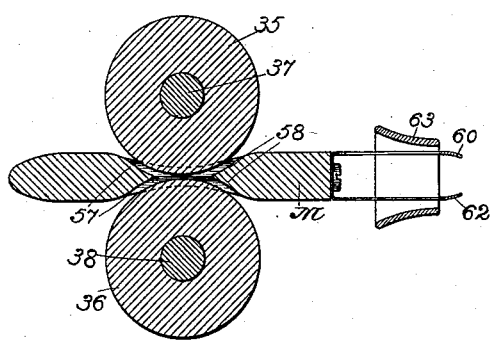
Figure 13:
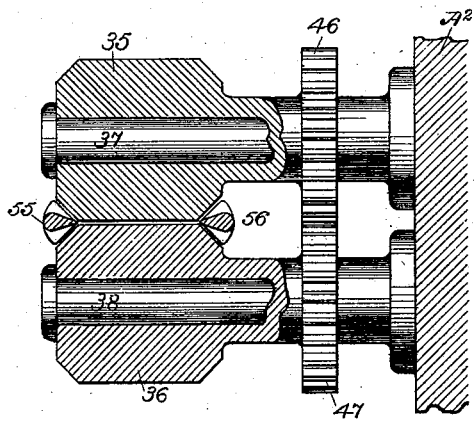
Figure 14:
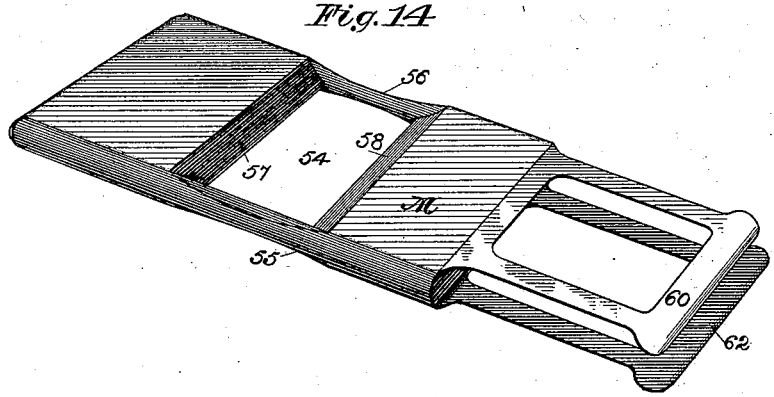

In the drawings accompanying and forming a part of this specification, Figure 1 is a front elevation of a band mechanism embodying my invention. Fig. 2 is a top view of what is below line $a$, Fig. 1, the carrier, however, not broken away. Fig. 3 is an elevation of that end which is at the right hand in Fig. 1, a part of the frame-work being shown in section. Fig. 4 is a view similar to a part of Fig. 3, illustrating the operation of my present improvements on the band-carrier. Figs. 5, 6, and 7 are three views similar to a part of Fig. 1, illustrating the operation of the band-shifter. Figs. 8, 9, 10, and 11 are four views illustrating the operation of the band-cutting apparatus in connection with the band-carrier. Fig. 12 is a vertical longitudinal section through the shuttle and feed rolls. Fig. 13 is a vertical transverse section through the same parts. Fig. 14 is a perspective view of the shuttle. Fig. 15 is a sectional view in line $b$, Fig. 4. Fig. 16 is a front view of the carrier arms and fingers as seen from the left hand in Figs. 1, 5, 6, and 7. Fig. 17 is a similar view of the band-shifter.

Similar characters designate like parts in all the figures.

As some of the parts shown in the drawings are the same parts described in my aforesaid prior application, I have herein designated the principal of them by the same characters as in said application, using other characters for minor details. Among such old parts are the frame $A^2$, (somewhat modified,) rod $H^2$, cam-shaft $S^2$, cam $P^3$, and the packing-box $A^3$. All these parts are supposed to fulfill the same functions and the shaft and rod to be operated in the same way and manner and by the same means as described in my said application, to which reference may be had.

It will be remembered that rod $H^2$ is operated from the devices which act to drive the full bunch of envelopes out of box $A^3$, and that during said movement of the envelopes said rod moves toward the left hand in Fig. 1, and is afterward returned by some suitable spring—as, for instance, the pull-spring 2—connected at one end to the frame and at the other end to the rod; also, that shaft $S^2$ is frictionally driven in the direction of the arrow 3, Fig. 3, and is normally held at rest by a stop, 4, on cam $P^3$, which stop rests on the hook 5 of a lever, 6, that is pivoted on stud 9, and that said hook is withdrawn by the return movement of rod $H^2$ to allow said cam and shaft to be revolved, this withdrawal being effected by means of a hook, 7, on said rod, and a latch, 8, (on said lever,) held in place by spring 10. The operation of this stop mechanism is illustrated in Figs. 12 and 13 of the aforesaid application.

It will be further remembered that cam $P^3$ operates (through roller 11) a lever, here designated by L, which lever is pivotally supported on stud 12, (or otherwise,) and carries at its outer end the band-carrier, being returned by some suitable spring—as, for instance, the pull-spring 13, Fig. 3, which is connected to said lever and frame $A^2$; also, that the band-carrier is accompanied by a band-shifter, here designated by T, which is operated by an arm, 14, fixed on rod $H^2$. Thus the carrier and shifter have in a general way, though not in all particulars, the same mode of operation as in the aforesaid application.

Having now described what is old, I will proceed to a detailed description of my present improvements, beginning with the band-carrier and band-shifter.

The lever L has at its outer end an arm, 16, which is provided with carrier-fingers 40 and 41. Said lever also carries a slide, 17, working under cap 18, which slide has a corresponding part or arm, 20, movable relative to arm 16, and provided with the similar fingers, 42 and 43. A spring, 21, connected to the cap (or lever) and slide serves to hold the two arms 16 and 20 normally open, as in Fig. 3. In Fig. 4 lever L is shown in three positions—namely, in its upper position, (said arms then being open,) at mid-stroke, and in its lowest position, where the arms are closed together. These positions are respectively designated by A, B, and C. The proper operation of slide 17 to open and close the said arms is effected by a stop, 22, and the aforesaid spring 21. Another stop, 23, is preferably formed on the frame, to insure that the slide shall be fully open in its upper position in case spring 21 should, for any reason, fail to do its work. Both of these stops may be made adjustable, if desired. While the band mechanism remains at rest lever L stands in position A. On starting the mechanism that lever swings over to position C, the slide 17 being thrown up during the latter part of said stroke, thereby closing arm 20 against arm 16, as there shown.

As before stated, the carrier-lever L is supported on a stud, 12. If it is deemed preferable, a shaft may obviously be substituted for the stud, suitable bearings being of course provided therefor. Stud 12 is rigidly held in place by fixing it in a bracket, 24, that is attached to the frame. Said lever in its preferred form has a hub, 25, onto which the hub 26 of the band-shifter T is fitted to slide closely but freely. Arm 14, above referred to, terminates close to one side of said hub 26, as shown best in Figs. 2 and 3. A pin, 27, is so placed in said hub 26 that when lever L stands in position A (lever L and shifter T always turning together) it will stand just front of the upper corner of said arm 14, as in Figs 6 and 7. By this means the rod H² can only operate the shifter when this and the carrier are in position A. As soon as the carrier swings over a little toward position B the said pin 27 passes beyond arm 14, thus preventing any further operation of the shifter until it returns to its uppermost position. When the shifter has been moved to the left hand, as in Fig. 6, it will be returned by arm 14 acting against flange 32, whether in position A, B, or C. At its outer end the shifter is divided into two arms, which are respectively designated by 28 and 30. In practice these arms are provided, as in my former application, with short band-pushing fingers 29, which work in corresponding shallow grooves, 31, in the carrier-fingers 40, 41, 42, and 43. By this means the band is prevented getting between the shifter-arms and the said band-carrying fingers.

Figure 9:
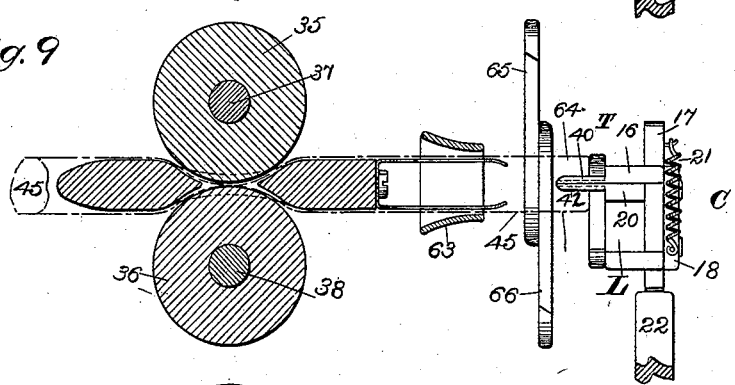
Figure 10:
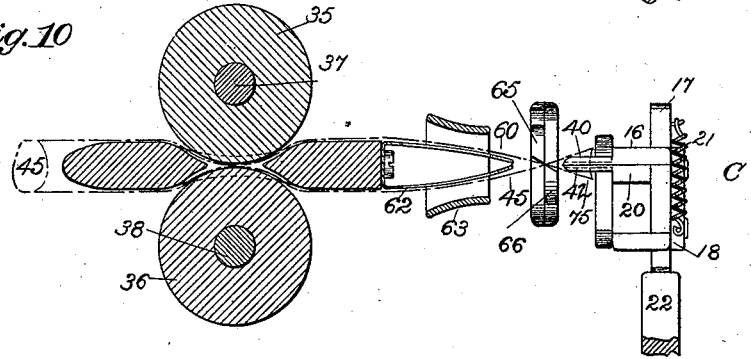
Figure 11:
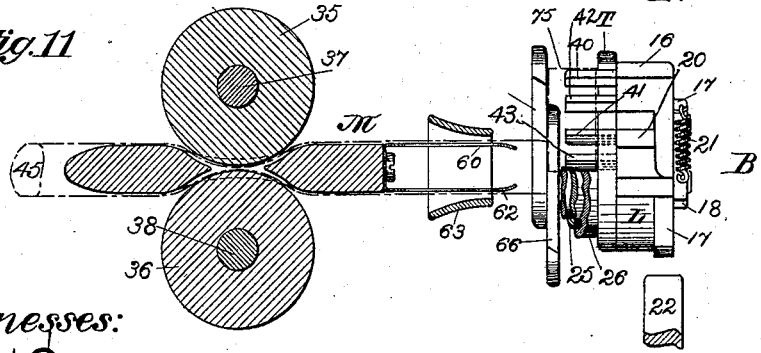

The band material to be used in this band mechanism is a tube made of suitable paper, and designated by 45 in Figs. 8 to 11, where it is shown in dotted lines. This tube is fed into the machine by means of a pair of feed-rolls, 35 36, which are supported by fixed studs (or by shafts, if preferred) 37 38. These rolls are geared together by spur-wheels 46 47, operated as follows: A lever, 48, is pivoted on a stud, 49, that is fixed to the frame. At its lower end this lever has a pin, 51, bearing on cam 50, whereby said lever is operated in one direction, a spring, 52, Fig. 1, serving to move it in the opposite direction. On its upper end said lever carries a pawl, 53, working into the teeth of gear 46; or a separate ratchet-wheel may be employed. Loosely supported by the feed-rolls there is a shuttle, M, over which the paper-tube passes both before and after reaching said rolls. This shuttle consists in a flat piece having a central opening, 54, Fig. 14, in which the rolls 35 and 36 meet, as well shown in Figs. 12 and 13. To facilitate the passage of the tube without crumpling the material thereof too much, the connecting sides 55 56 are preferably beveled and rounded off, as in Fig. 13. The shuttle is held in place within moderate limits by said sides and the inner faces, 57 58, which faces are made steep enough to resist the tendency of the rolls to draw the shuttle between them. Said shuttle is incidentally further guided or steadied in its place by a pair of light springs, 60 62, which project from the right-hand end thereof and stand within a loop-shaped guard, 63, rigidly affixed to bracket 24. The principal office, however, of said springs is to open the band-tube 45 within guard 63, so that said opened end may readily pass over the carrier-fingers when the carrier is in position C, as shown in Fig. 9, where 64 and 65 designate, respectively, the upper and lower sides of the tube of band material. After passing said springs and the guard 63, the tube 45 passes between two ordinary shear-blades, 65 and 66, both of which are simultaneously operated, and are pivoted on a stud, 67, fixed in bracket 24. The lower blade, 66, has an arm, 68, operated in one direction to close the blades by cam 70, and the upper blade in arm 69 operated by cam 71, a spring, 72, being provided to operate both arms in the opposite directions to open the blades. Instead of the spring 72, a separate spring may of course be employed for each shear-blade arm.

The operation of my improvements is as follows: The cam-shaft being started, as hereinbefore described, the band-carrier is swung down from position A to position C, closing the band carrying fingers, as in Fig. 8. Cam 50 now acts through the devices described to feed the tube 45 through between the shear-blades and over said fingers, as in Fig. 9. Next the cams 70 and 71 close said blades, as in Fig. 10, cutting a band, 75, off the end of said tube, which band then rests altogether on fingers 40, 41, 42, and 43. During the cutting operation the shuttle-springs 60 62, being very light, close together more or less, as in said Fig. 10, to allow the tube to flatten between the blades, and thus be cut straight across. The band being now on the fingers, the carrier starts up toward position A, thus allowing said fingers to open and securely hold the band, which is then carried up, as in Fig. 5, ready for the bunch of envelopes S to be driven out of box A. On this event taking place, as described in my aforesaid application, the said bunch S is first driven through between said fingers about one-half its length, then the shifter T is moved with the bunch, as in Fig. 6, thereby pushing the band off the fingers, as there shown, onto the bunch. Next the shifter is returned to its place, as in Fig. 7, and the bunch removed in the usual way.

It will of course be understood that all parts of this improved mechanism, and more especially the minor details thereof, are capable of modification in various ways and degrees, after the manner of machines in general, without departing from my invention.

Having thus described my invention, I claim—

1. The improved band-carrier herein described, it comprising two parts or arms, one movable relative to the other, each being provided with band-carrying fingers, substantially as described.

2. The combination of lever L, having arm 16, slide 17, carried on said lever and having arm 20, and means, substantially as described, operating said lever and slide to open and close said arms, these arms being furnished with band-carrying fingers, substantially as described.

3. The combination of lever L, operating substantially as described, and provided with fingers 40 and 41, slide 17, provided with fingers 42 43, spring 21, and stops 22 23, substantially as described.

4. The combination of a band-carrier, operating substantially as described, shifter T, constructed to slide toward and from said carrier, and having pin 27, and a reciprocating arm, 14, engaging with said pin in one position of the carrier, substantially as described.

5. The improved shuttle herein described for envelope-banding machines, it comprising the flat piece M, having the opening 54 and the faces 57 58, substantially as shown and described.

6. The combination, in a band mechanism, of the shuttle M, having opening 54, and feed-rolls meeting in said opening, substantially as described.

7. The combination, with the shuttle of a band mechanism, of the springs 60 62, substantially as and for the purpose described.

8. The combination of the feed-rolls, shuttle M, having springs 60 62, and a guard guiding said springs, substantially as described.

9. The combination, in a band mechanism, of the tube-feeding mechanism, substantially as described, a band-carrier in front of said mechanism, and shear-blades between said mechanism and said carrier operating to cut off the band, substantially as described.

FRANCIS H. RICHARDS.

Witnesses:
 GEO. W. DRAKE,
 CLARENCE E. BUCKLAND.